(12) United States Patent
Brandt et al.

(10) Patent No.: US 10,005,549 B2
(45) Date of Patent: Jun. 26, 2018

(54) COAXIAL LIFTING SYSTEM

(71) Applicant: ROTORSCHMIEDE GMBH, Munich (DE)

(72) Inventors: Vitali Brandt, Wahrenholz (DE); Andrei Alexandrovich Vlasov, Kumertau (RU); Vladimir Yurievich Ivanov, Ufa (RU)

(73) Assignee: RS Helikopter GmbH, Munich (DE)

( * ) Notice: Subject to any disclaimer, the term of this patent is extended or adjusted under 35 U.S.C. 154(b) by 377 days.

(21) Appl. No.: 14/745,780

(22) Filed: Jun. 22, 2015

(65) Prior Publication Data
US 2015/0375859 A1    Dec. 31, 2015

(30) Foreign Application Priority Data

Jun. 26, 2014    (RU) .......................... 2014125997/11

(51) Int. Cl.
*B64C 27/10* (2006.01)
*B64C 27/605* (2006.01)
*B64D 35/06* (2006.01)
B64D 27/14 (2006.01)

(52) U.S. Cl.
CPC ............ *B64C 27/10* (2013.01); *B64C 27/605* (2013.01); *B64D 35/06* (2013.01)

(58) Field of Classification Search
CPC ......... B64C 27/08; B64C 27/10; B64C 27/32; B64C 27/59; B64C 27/605; B64C 27/7216; B64C 27/7255; B64D 35/04; B64D 35/06; F03D 1/025

USPC ........ 416/112, 114, 115, 120, 128, 130, 131, 416/198 R, 198 A; 244/17.11, 17.23, 244/17.25

See application file for complete search history.

(56) References Cited

U.S. PATENT DOCUMENTS

| | | | | |
|---|---|---|---|---|
| 3,572,616 A | * | 3/1971 | Ulisnik ................... | B64C 27/54 244/17.23 |
| 4,525,123 A | * | 6/1985 | Curci ...................... | B64C 27/54 416/114 |
| 7,264,199 B2 | * | 9/2007 | Zientek ................... | B64C 27/08 244/17.11 |

FOREIGN PATENT DOCUMENTS

RU    2307766 C1 * 10/2007

* cited by examiner

*Primary Examiner* — Jason Shanske
*Assistant Examiner* — Alexander White
(74) *Attorney, Agent, or Firm* — Collard & Roe, P.C.

(57) ABSTRACT

A reliable reduced weight coaxial lifting system includes a reducing gear with two shafts rotating in opposite directions, upper and lower rotor hubs mounted on the respective shafts and upper and lower swashplates connected to one another, which are movable in the axial direction and are kinematically linked to guides of blades positioned on the upper and lower rotor hubs. Guides of the blades are connected to the upper swashplate by rockers mounted on a slide block located above the upper rotor hub and guides of the blades of the lower rotor hub are connected by tie rods directly to the lower swashplate. The lower swashplate is connected to control systems of a collective and a cyclical pitch and the slide block is connected to a control system of a differential pitch of the upper rotor.

1 Claim, 1 Drawing Sheet

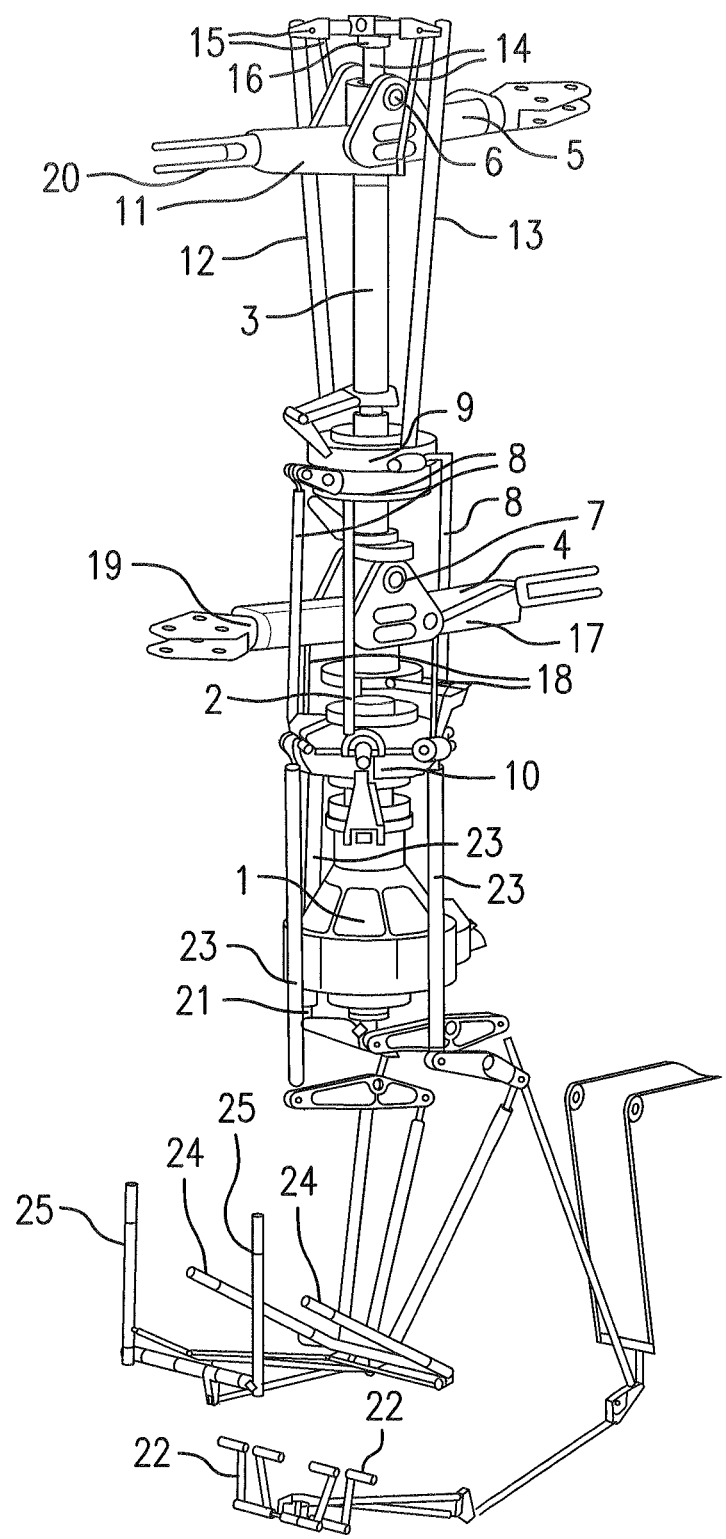

COAXIAL LIFTING SYSTEM

CROSS-REFERENCE TO A RELATED APPLICATION

The invention described and claimed hereinbelow is also described in Russian Patent Application 2014 125997/11, filed on Jun. 26, 2014. The Russian Patent Application, the subject matter of which is incorporated herein by reference, provides the basis for a claim of priority of invention under 35 U.S.C. 119(a)-(d).

BACKGROUND OF THE INVENTION

The present invention broadly relates to, aeronautical engineering and specifically to rotors of aircraft, for example, for use in helicopters and manufacture of same.

Coaxial lifting systems are known. For example, a coaxial lifting system contains a reducing gear with two shafts rotating in opposite directions on which the rotors are mounted, two swashplates connected to one another by tie rods and movable in the axial direction, which are kinematically linked to guides of blades and to a summing leverage control system of the collective and differential pitch. Levers of the summing control system are respectively connected to the lower swashplate and the internal tie rod. Control of the upper rotor is accomplished by use of a slide block mounted on the shaft of the upper rotor movably along its axis and kinematically coupled to the internal tie rod the upper swashplate and the blade guides. The internal tie rod is lengthened and fitted with a yoke which is mounted at its free end and kinematically linked to a slide block implemented in the form of a sliding hub which is connected to the shaft of the upper rotor on the axis whereof there is mounted a frame with facility for wobbling, a lifting lever link connected to the facility for wobbling relative to the latter, where the direction of the axes of the wobbling of the frame and the levers are mutually perpendicular (Patent RF No. 120627, publ. Sep. 27, 2012).

A disadvantage of the known solution is the complexity of the design as a result of the large number of hinged joints linking the slide block located below the upper rotor to the upper swashplate and the blade guides of the upper rotor and also as a result of the presence of a complex summing mechanism for controlling the collective and differential pitch which has a large number of levers. The presence of a large number of kinematically interacting elements reduces the reliability of the system and increases its weight.

One attempted technical solution embodies a coaxial lifting system containing a reducing gear with two shafts rotating in opposite directions on which are mounted rotor hubs, two swashplates that are connected to one another and movable in the axial direction, and which are kinematically linked to guides of blades, and to the summing lever system of the collective and differential pitch. The rotor hubs are made as two-blade with total horizontal hinges. The guides of the blades of the lower rotor hub are connected to the lower swashplate by rockers mounted on a slide block located below the lower rotor hub, and the guides of the blades of the upper rotor hub are connected by tie rods directly to the upper swashplate. The radii of the guides on the upper rotor hub are smaller than on the lower rotor hub, and the lower swashplate and the slide block are kinematically linked to the control system of the collective and differential pitch by a summing lever system in which one lever is connected by one arm to the differential pitch control and the second is connected to the slide block and the second lever which is articulated to the first is connected by its arms to the collective pitch control and to the slide block of the lower swashplate (Patent RF No. 2307766, publ. Oct. 10, 2007).

A disadvantage of this system is its low reliability due to the complex design since the summing lever system connected to the slide block and the lower swashplate is over-saturated with hinged-articulated links with bearing nodes mounted in a restricted kinematic space on mutually mobile slide blocks. In addition, the presence of a large number of kinematically interacting elements increases its weight.

SUMMARY OF THE INVENTION

The present invention overcomes the shortcomings of known arts, such as those mentioned above.

To that end, the present invention provides a coaxial lifting system that display increased reliability and reduced weight.

In an embodiment, the coaxial lifting system contains a reducing gear with two shafts rotating in opposite directions on which are mounted rotor hubs, two swashplates that are connected to one another and movable in the axial direction, and which are kinematically linked to guides of blades. The guides of the blades of the upper rotor hub are connected to the upper swashplate by rockers mounted on a slide block located above the upper rotor hub. Guides of the blades of the lower rotor hub are connected by tie rods directly to the lower swashplate. The radii of the guides on the upper rotor hub are smaller than on the lower rotor hub. The lower swashplate is connected to the control systems of the collective and cyclical pitch by three tie rods and the slide block is connected to the control system of the differential pitch of the upper rotor by means of a tie rod located inside the shaft of the upper rotor.

The control of the differential pitch of only the upper rotor and the control of the cyclic and collective pitch using three tie rods eliminates the lever summing mechanism of the collective and differential pitch, reduces the number of levers and therefore bearing elements required to control coaxial rotors which simplifies the design of the lifting system and thereby increases its reliability and also reduces its weight.

BRIEF DESCRIPTION OF THE DRAWINGS

Further features and advantages of the invention will become apparent from the description of the exemplary embodiment that follows, with reference to the attached figure, which schematically depicts the proposed coaxial lifting system.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The inventive coaxial lifting system contains a reducing gear 1 with two shafts 2, 3 rotating in opposite directions on which are mounted hubs of the lower 4 and upper 5 rotors on which the blades are mounted. The lower rotor hub 4 and the upper rotor hub 5 are implemented as two-blade with common horizontal hinges 6 and 7 which are not subjected to centrifugal force.

The control system of the rotors 4 and 5 contains two interconnected be rods 8 and upper 9 and lower 10 swashplates which are movable in the axial direction.

The guides of the blades 11 of the upper rotor hub 5 are connected to the upper swashplate 9 by tie rods 12, 13 and tie rods 14 via rockers 15 mounted on a slide block 16 mounted above the upper rotor hub 5.

The guides of the blades 17 of the lower rotor hub 4 are connected by means of tie rods 18 directly to the lower swashplate 10.

The same values of the transmission ratios between the axial hinges 19 and 20 of the rotor hubs 4 and 5 and the swashplates 9 and 10 are ensured by making the radii of the guides 11 on the upper rotor hub 5 smaller than on the guides 17 on the lower rotor hub 4. This means that the kinematic control system is selected so that when giving the collective or cyclic pitch, the angles of pitch on the upper 5 and on the lower rotor 4 change by the same magnitude.

The slide block 16 is connected by a tie rod 21 located inside the shaft 3 of the upper rotor 5 to the control system of the differential pitch of the upper rotor 22. The lower swashplate 10 is connected by three tie rods 23 to the control system of the collective pitch 24 and the control system of the cyclic pitch 25.

The proposed coaxial lifting system operates as follows.

During operation, the shafts 2 and 3 of the reducing gear 1 with the lower 4 and upper 5 rotors mounted thereon rotate in different directions. At the same time, the guides of the blades 11 of the upper rotor hub 5 having a horizontal hinge 6 connected to the upper swashplate 9 by tie rods 12, 13 via rockers 15 mounted on a slide block 16 rotate with the upper rotor 5 in one direction, for example, anticlockwise. The guides of the blades 17 of the lower rotor hub 4 having a horizontal hinge 7 connected by tie rods 18 directly to the lower swashplate 10, rotate with the lower rotor 4 in the opposite direction, i.e. clockwise.

The cyclic pitch is controlled by inclining the swashplates by the three tie rods 23 from the control system of the cyclic pitch 25, where the cyclic variation of the angles of pitch of the blades of the upper rotor 5 is accomplished by tie rods 12, 13 and tie rods 14 by rockers 15 from the swashplate 9. The variation of the angles of pitch on the lower rotor 4 from the swashplate 10 is accomplished directly by tie rods 18. Since the magnitudes of the transmission ratios between the axial hinges 19 and 20 of the rotor hubs and the swashplates 9 and 10 are selected to be the same, the cyclic variation of the angles of pitch on the same azimuths of both rotors will be the same.

Control of the collective pitch is accomplished by the action of three tie rods 23 from the control system of the collective pitch 24 on the lower swashplate 10 and both swashplates 9, 10 connected to one another by tie rods 8 are displaced simultaneously by the same amount. Since the transmission ratios between the swashplates and the axial hinges are selected to be the same, in the event of an axial displacement of the swashplates, there is a simultaneous increase or decrease in the angles of pitch at the blades of the upper and lower rotors by the same magnitude.

The control of the differential pitch is accomplished by varying the angles of pitch of the blades of only the upper rotor 5 as follows.

By displacement of the tie rod 21 from the control system of the differential pitch of the upper rotor 22, the slide block 16 with rockers 15 is displaced, which results in a variation in the angle of pitch of the upper rotor 5. Thus, the proposed coaxial lifting system ensures increased reliability and reduced weight as a result of a reduction in the number of kinematic elements.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A coaxial lifting system, comprising:
   a reducing gear with two shafts that rotate in opposite directions and on the two shafts are mounted an upper rotor hub and a lower rotor hub, respectively; and
   upper and lower swashplates connected to one another that are movable in an axial direction and are kinematically linked to guides of blades disposed on the upper rotor hub and the lower rotor hub;
   wherein the guides of the blades of the upper rotor hub are connected to the upper swashplate by rockers mounted on a slide block located above the upper rotor hub;
   wherein the guides of the blades of the lower rotor hub are connected by tie rods directly to the lower swashplate;
   wherein the lower swashplate is connected to control systems of a collective pitch and a cyclical pitch by three tie rods;
   wherein the slide block is connected to a control system of a differential pitch of the upper rotor hub by a tie rod located inside the shaft of the upper rotor, such that displacement of the tie rod located inside the shaft of the upper rotor displaces the slide block and rockers, which results in a variation of an angle of pitch of only the upper rotor hub; and
   wherein moving the three tie rods connecting the lower swashplate to the control systems of the collective pitch and cyclical pitch moves the tie rods connecting the guides of the blades of the lower rotor hub to the lower swashplate and also tie rods connecting the upper swashplate to the rockers, to change the angle of pitch of the blades of the lower rotor hub and upper rotor hub at the same time and at the same magnitude.

\* \* \* \* \*